United States Patent [19]
Bao et al.

[11] Patent Number: 4,783,988
[45] Date of Patent: Nov. 15, 1988

[54] APPARATUS AND METHOD FOR DETECTING LEAKS IN WELDED HEAT EXCHANGER PLATES

[75] Inventors: Frank W. Bao, Cincinnati, Ohio; Richard K. Dressman, Florence, Ky.; James N. Harrison, Cincinnati, Ohio

[73] Assignee: Cincinnati Control Dynamics, Inc., Cincinnati, Ohio

[21] Appl. No.: 89,144

[22] Filed: Aug. 25, 1987

[51] Int. Cl.$^4$ .............................................. G01M 3/26
[52] U.S. Cl. ...................................................... 73/46
[58] Field of Search ........................................ 73/46, 40

Primary Examiner—Stewart J. Levy
Assistant Examiner—Joseph W. Roskos
Attorney, Agent, or Firm—Frost & Jacobs

[57] ABSTRACT

An apparatus and a method for simultaneously testing the integrity of the welds in the plate pairs of a heat exchanger of the type made up of a stack of pairs of annular plates. The plates of each pair are substantially identical, having corresponding sets of first and second gas ports arranged alternately about each plate. The plates of each pair are joined together by continuous welds formed about each of their corresponding and aligned first and second gas ports. Those portions of the plates located between adjacent first and second gas ports are spaced from each other to permit passage of gas therebetween. The test apparatus comprises a fixed base member and top shiftable vertically toward and away from the base member between open and closed positions. The base member and the top member support, respectively, upper and lower annular seal assemblies. When a plate pair to be tested is located on the lower seal assembly, and the top member and upper seal assembly are closed thereon, the upper and lower seal assemblies form seals about their inner and outer peripheries and form a sealed chamber about each gas port of the plate pair and its surrounding weld. Each sealed chamber is connected to a leak detector. Air under pressure is introduced between the plates of the pair. Leakage of air through any of the welds into its respective sealed chamber is recorded.

1 Claim, 11 Drawing Sheets

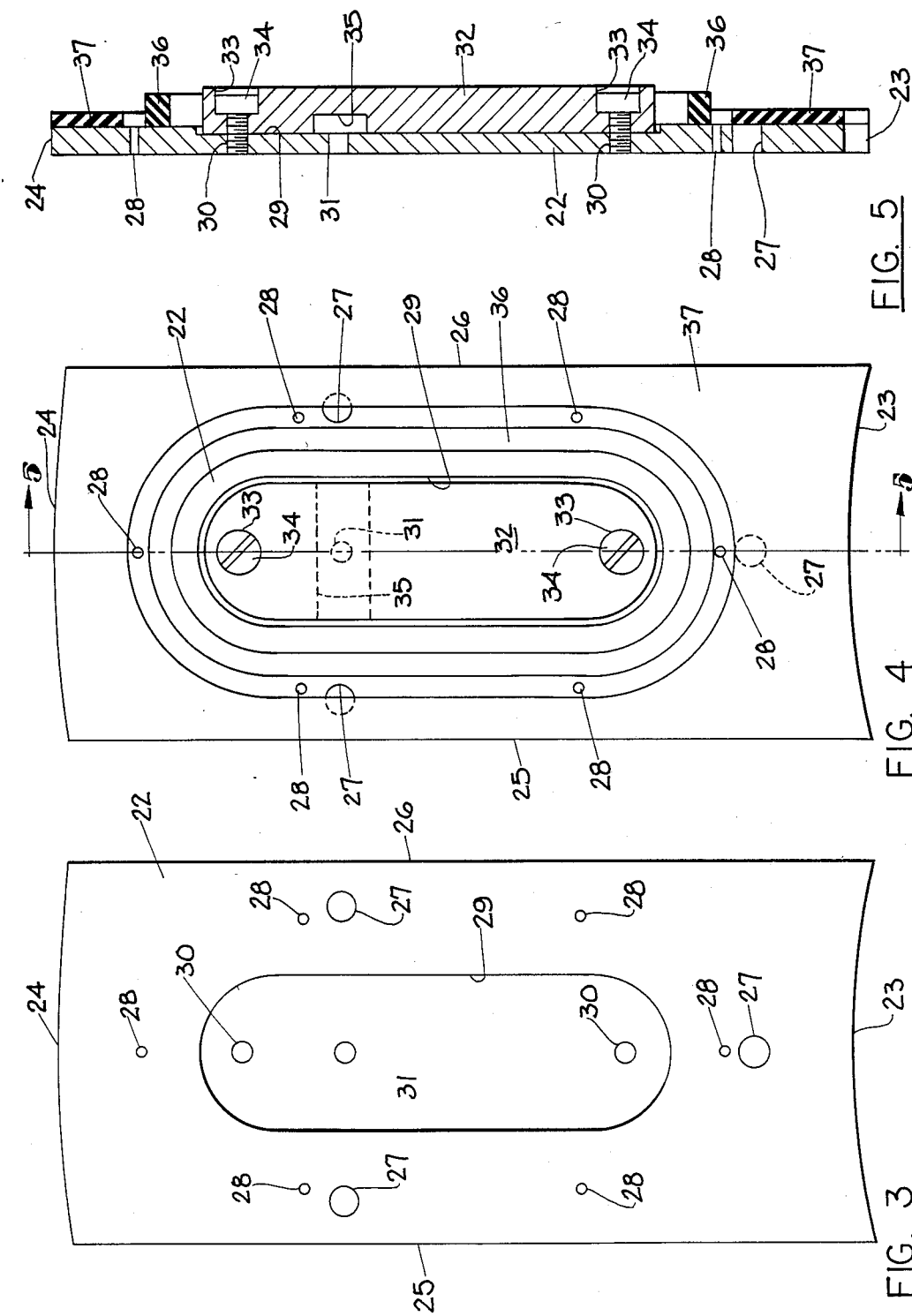

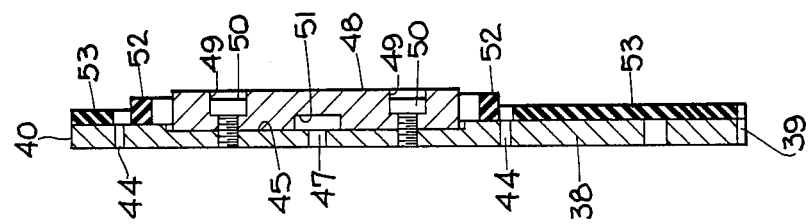
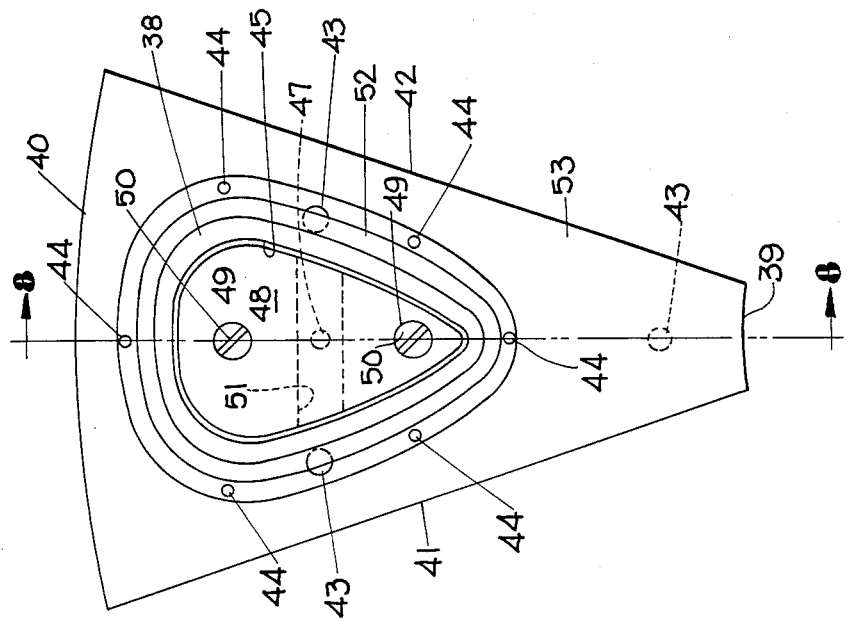
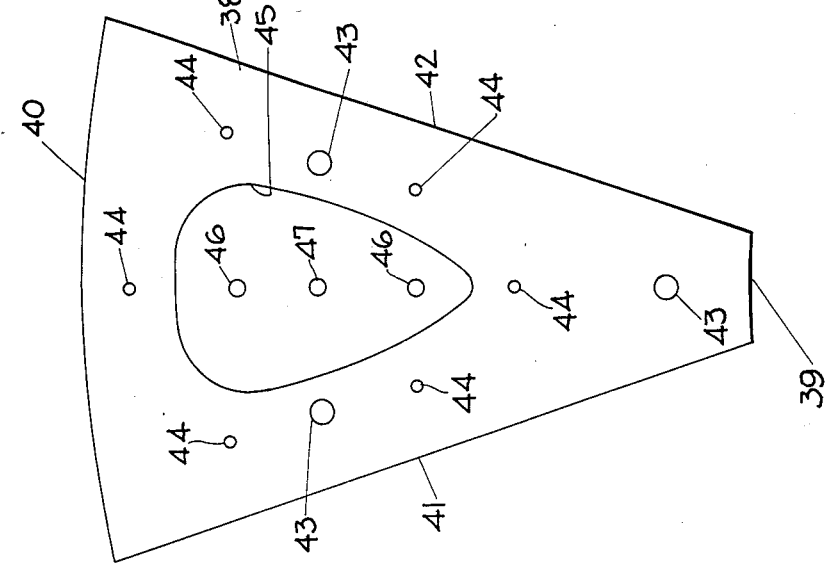

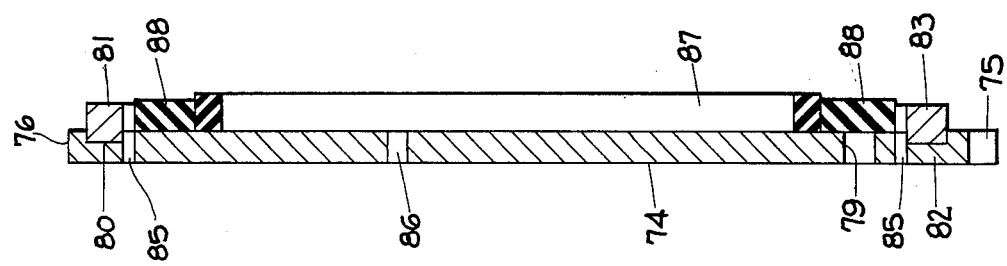

APPARATUS AND METHOD FOR DETECTING LEAKS IN WELDED HEAT EXCHANGER PLATES

TECHNICAL FIELD

The invention relates to apparatus and method for detecting leaks in welded heat exchanger plates, and more particularly to such an apparatus and method whereby in a pair of heat exchanger plates welded together about each of their gas ports, the integrity of all of the welds are individually and simultaneously tested and leaking welds are recorded and marked.

BACKGROUND ART

Heat exchangers of the type to which the present invention is directed are well known in the art. They are used, for example, as recuperators for turbine engines and the like.

Such heat exchangers are madde up of a plurality of annular plates. Each annular plate has sets of first and second gas ports formed therein, the first and second gas ports of the sets being arranged alternately thereabout. The plates are arranged in pairs and the plates of a pair are superposed one upon the other with their respective first and second sets of gas ports aligned. The plates of a pair are joined together by continuous weld lines extending about each of their aligned first and second gas ports.

The plates of a pair are essentially identical with the exception that the areas of the plates between their arrays of alternate first and second gas ports are given different configurations. When the plates are welded together, their surface configuration cooperate to slightly space the plates from each other in those areas between its first and second gas ports so that gases can pass between the plates of the pair. In a given heat exchanger, as many as two hundred or more pairs of plates are stacked with their first and second sets of gas ports aligned. The plate pairs are joined together by being welded at their outer edges. In use, through appropriate ducting and manifolding gases pass through the aligned sets of first gas ports in the stack of plate pairs, and return through the aligned sets of second gas ports. In the meantime, hot spent gases pass between the plates of each pair in heat exchange relationship with those gases passing through the aligned gas ports.

It is important that the welds about each of the first and second gas ports of each heat exchanger plate pair be continuous and leak-free so that the gases passing through the first and second gas ports are completely isolated from the hot spent gases passing between the plates of each pair. Heretofore, the welds in question were inspected visually. This method of inspection is not only time consuming, but also is far from fool-proof.

The present invention is based upon the development of a fixture which will receive a welded pair of heat exchanger plates and will form a discrete sealed chamber about each of the weld lines of the plate pair and the gas port about which that weld line extends. Each of the sealed chambers is connected to its own leak detector. Means are provided to introduce air under pressure between the plates of the pair being tested. Should any one of the continuous weld lines be faulty, air will leak into its respective chamber and will be detected by its respective sensor. Means are provided to record any leak which might occur and means may also be provided to mark the faulty weld line.

The test apparatus or fixture of the present invention is simple in construction. The apparatus is capable of detecting and identifying extremely small leaks and the entire test sequence for a welded pair of heat exchanger plates can be accomplished very rapidly.

The method of the present invention includes the steps of locating the plate pair to be tested within the fixture, closing the fixture upon the plate pair, clamping the fixture in closed position, sealing the individual chambers about the weld lines, introducing pressurized air between the plates of the pair being tested, logging the data generated by the test, unclamping the fixture, opening the fixture, marking any faulty weld line discovered by the test, and removing the tested pair of plates from the fixture.

The apparatus and method of the present invention lend themselves well to total automation. The operation of the apparatus or fixture can be computer controlled, and the loading or unloading of plate pairs into and out of the apparatus can be accomplished by robot means.

DISCLOSURE OF THE INVENTION

According to the invention there is provided an apparatus and a method for simultaneously testing the integrity of the welds in the plate pairs of a heat exchanger of the type made up of a stack of pairs of annular plates. The plates of each pair, being substantially identical, define a central opening by virtue of their annular shape. The plates of a pair have corresponding and coextensive sets of first and second gas ports arranged alternately about the plates. The plates of a pair are joined together back-to-back, with their first and second gas ports aligned, by means of continuous welds formed about each of their aligned and corresponding first and second gas ports. Those portions of the plates of the pair, located between adjacent first and second gas ports, are so configured as to be spaced from each other by a distance sufficient to permit the passage of gas therebetween.

The test apparatus comprises an annular base member fixed to an appropriate support. A corresponding annular top member is mounted above the base member in such a way as to be shiftable vertically toward and away from the fixed base member between open and closed positions.

The annular base member supports a lower annular seal assembly. The lower annular seal assembly comprises a plurality of metallic segments equal in number to the number of first and second gas ports in the plate pair to be tested. Each metallic segment has affixed thereto an inner resilient seal member and an outer resilient seal member.

The top member of the fixture carries on its underside an annular seal assembly substantially identical to and corresponding to the lower seal assembly. Thus, the upper seal assembly is made up of a plurality of metallic segments, equal in number to the number of first and second gas ports in the plate pair to be tested, and each having an inner and outer resilient seal member mounted thereon. When a plate pair to be tested is located on the lower seal assembly, and the top member and its upper seal assembly are lowered to the closed position, the inner seals of the upper and lower seal assemblies form a sealed chamber about each plate pair weld and the gas port it surrounds. The outer seals of the upper and lower seal assemblies surround and are spaced from their respective inner seals, engage the adjacent one of the pair of plates, and sealingly engage inner and outer sealing rings to seal the inner and outer peripheral edges of the upper and lower seal assemblies. The inner and outer sealing rings are provided with a plurality of inlet means, connected to a source of air under pressure, for introducing the air under pressure between the plates of the pair being tested.

Each of the metallic segments of the lower seal has a passage formed therethrough in the region of the sealed chamber it forms. This passage leads to a corresponding passage through the base member and is connected to a leak sensor or detector, there being a leak detector for each sealed chamber surrounding each continuous weld. When air under pressure is introduced between the plates of the pair being tested, a leak in any of the continuous welds will be detected by its respective sensor and appropriately recorded. When the apparatus or fixture is opened, after depressurization, means may be provided to mark any leaking weld and the pair of plates having been tested is removed and the fixture is ready for the next test.

BRIEF DESCRIPTION OF THE DRAWINGS

FIG. 3 is a plan view of one type of metallic segment of the lower annular seal assembly.

FIG. 4 is a plan view of the segment of FIG. 3 with the inner and outer seals and the spacer mounted thereon.

FIG. 5 is a cross sectional view taken along section line 5—5 of FIG. 4.

FIG. 6 is a plan view of the other type of metallic segment of the lower annular seal assembly.

FIG. 7 is a plan view of the metallic segment of FIG. 6 with the inner and outer seals and the spacer mounted thereon.

FIG. 8 is a cross sectional view taken along section line 8—8 of FIG. 7.

FIG. 11 is a plan view similar to FIG. 4 illustrating another embodiment of a parallel sided segment.

FIG. 12 is a cross sectional view taken along section line 12—12 of FIG. 11.

DETAILED DESCRIPTION OF THE INVENTION

Figure 1:
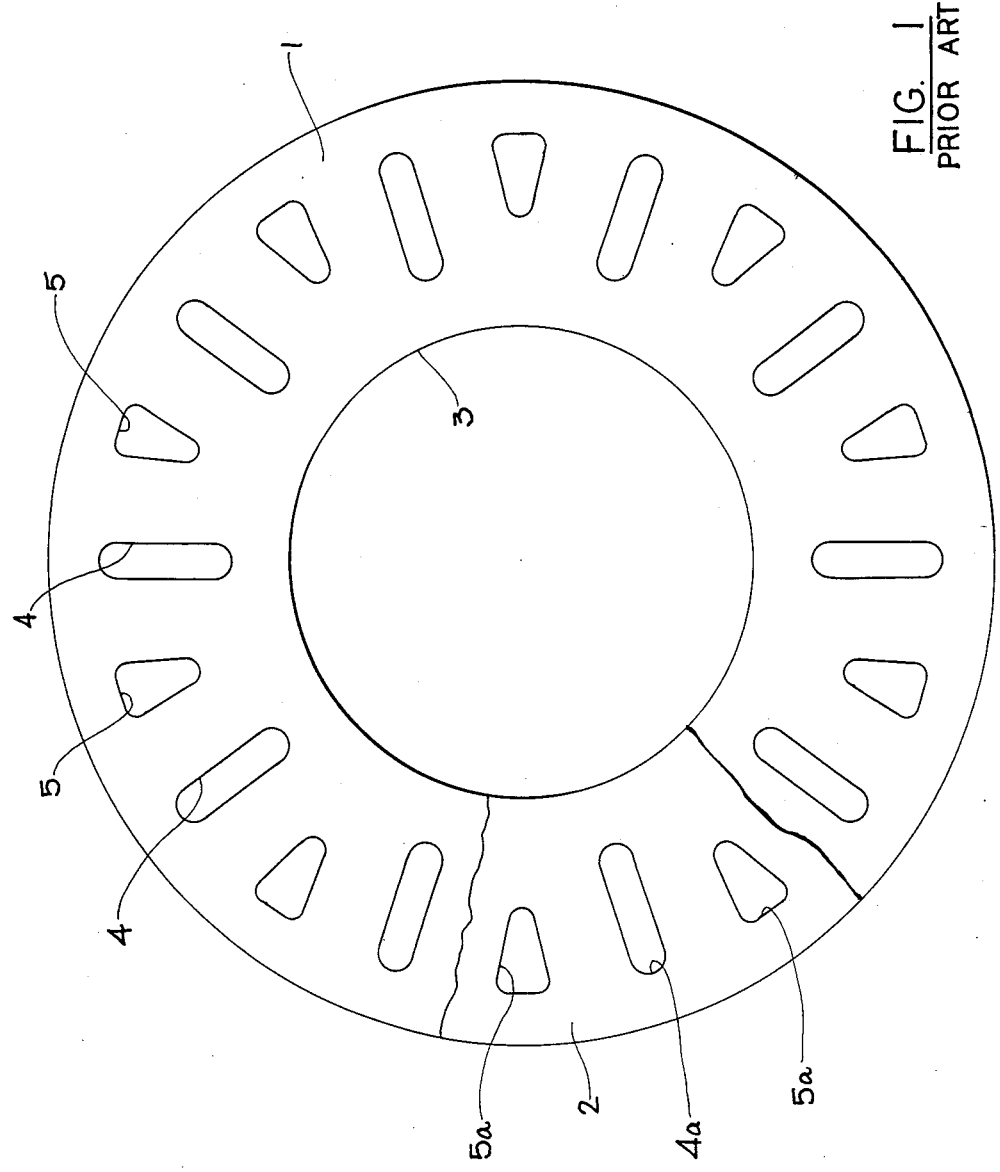
FIG. 1 is a fragmentary plan view of an exemplary welded pair of prior art heat exchanger plates.

Reference is first made to FIG. 1 wherein a pair of heat exchanger plates, of the type to be tested by the apparatus and method of the present invention, is illustrated. The pair is made up of a first plate 1 and a second plate 2. Plates 1 and 2 are similar in most respects, as will be apparent.

Plates 1 and 2 are annular in configuration and define a central opening 3. Plate 1 has a first set of identical gas ports 4 formed therein, together with a second set of identical gas ports 5. It will be noted that the gas ports 4 and 5 of plate 1 are arranged alternately and are substantially evenly spaced about the plate. Plate 2 is similarly provided with a first set of gas ports 4a substantially identical to gas ports 4 of plate 1, and a second set of gas ports 5a substantially equivalent to gas ports 5 of plate 1. Again, the gas ports 4a and 5a are alternately arranged and evenly spaced about plate 2.

When plate 1 is superposed upon plate 2 and its gas ports 4 and 5 are aligned with gas ports 4a and 5a, respectively of plate 2, those areas of plates 1 and 2 immediately adjacent the gas ports lie in abutment. Plates 1 and 2 are permanently joined together by continuous weld lines formed about each of the aligned gas ports 4—4a and 5—5a of the plates. Such continuous weld lines are diagrammatically represented by broken lines 6 and 7 in FIG. 9. The welds 6 and 7 are continuous and are most usually accomplished by resistance welding or laser welding.

Those areas of heat exchanger plate 1 located between adjacent ones of gas ports 4 and 5 and those areas of plate 2 located between adjacent ones of gas ports 4a and 5a are so configured as to be slightly spaced from each other so that gases can pass between the plates 1 and 2 in those areas. For example, plate 1 may be lightly corrugated in those areas and plate 2 might be embossed with a "corn cob" design made up of a plurality of small dimples. The dimples of plate 2 contact the corrugations of plate 1 and thereby maintain those areas of the plates substantially in parallel spaced relationship.

The usual heat exchanger made up of plate pairs of the type illustrated in FIG. 1 typically constitutes a stack of up to 200 or more such plate pairs all arranged with their central openings 3 and their corresponding exhaust ports in alignment. Through appropriate ducting and manifolding, pressurized gases are caused to flow through aligned ports 5 in one direction and return through aligned ports 4 in the opposite direction. This passage of the gases through aligned ports 5 and aligned ports 4 tends to reduce or substantially eliminate any swirling motion in such gases. At the same time, heated spent or exhaust gases are caused to pass through aligned ports 3 and between the plates of each welded pair in the spaced areas between their gas ports 4—4a and 5—5a. Thus, the hot spent gases are in heat exchange relationship with the gases passing through the aligned gas ports. As a result, a heat exchanger of this type can at the same time act as a heat exchanger, a diffuser, and a muffler. Usually, gases passing through the gas ports is pressurized, while the exhaust gases passing between the plates of each pair are substantially at atmospheric pressure.

For the proper operation of the heat exchanger, it is imperative that the continuous weld lines 6 and 7 and the material of plates 1 and 2 adjacent these weld lines be leak free so that the gases passing through the gas ports are isolated from the exhaust gases. Heretofore, prior to assembly into a heat exchanger, the welds of the individual plate pairs were visually inspected. Once the plate pairs passed a visual inspection, they were aligned and stacked with other pairs, and adjacent pairs were welded together about their outside peripheries. Visual inspection is at best inadequate, and there has been a need for a testing system which will subject the welds to pressurized gases at a pressure approximating that which they will encounter during operation of the heat exchanger. The present invention provides an apparatus and method for such testing wherein heat exchanger plates pairs can be rapidly tested. Furthermore, the apparatus and method of the present invention lend themselves well to computer control and full automation.

Figure 2:
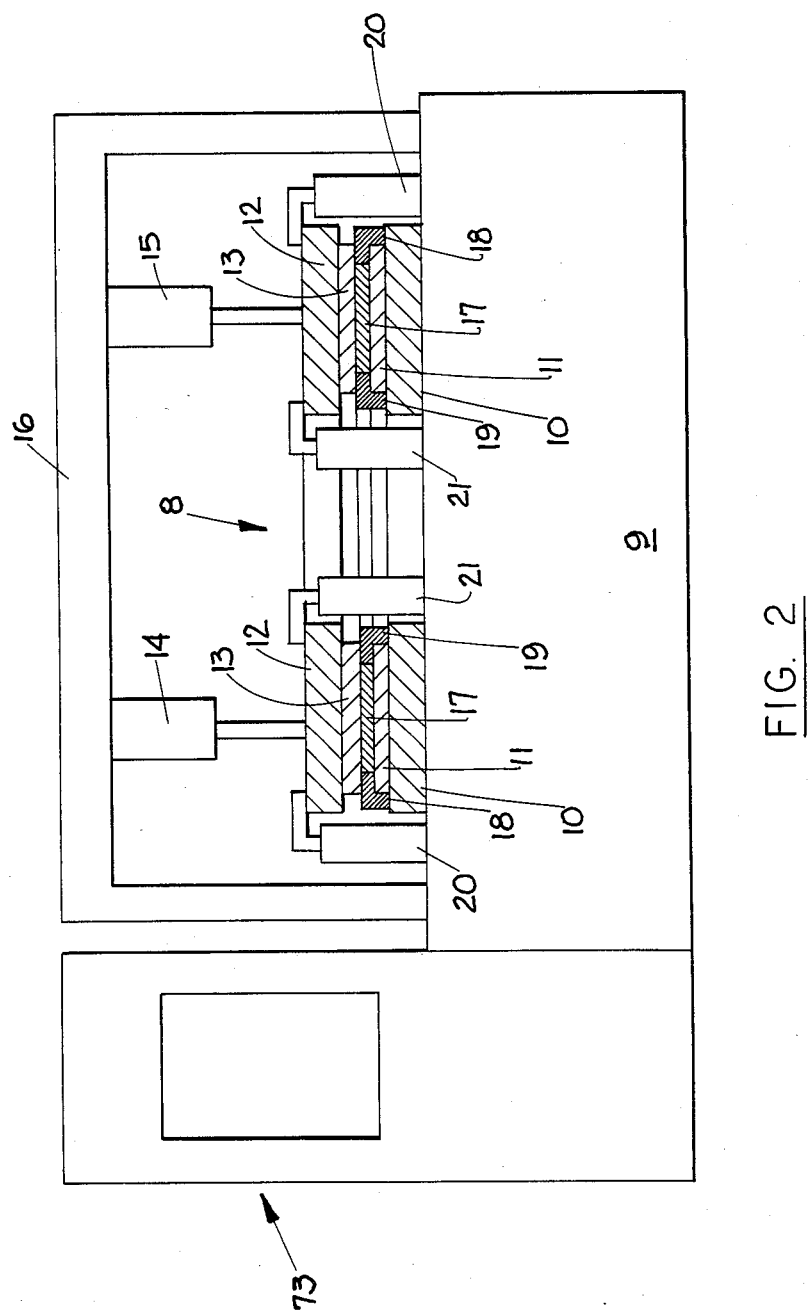
FIG. 2 is a simplified elevational view, partly in cross section of the apparatus of the present invention.

The testing apparatus of the present invention is illustrated in simplified form in FIG. 2. The test apparatus is generally indicated at 8 and is supported on a suitable base or stand 9. The actual testing apparatus, itself, is an annular structure and is illustrated in diametric cross section in FIG. 2. The test structure comprises an annular base member 10 which is fixedly mounted on stand 9. The base member 10 supports and has affixed thereto a lower annular seal assembly 11. An annular top member 12, similar to base member 10, supports an upper annular seal assembly 13. The upper annular seal assembly 13 and the annular top member 12 to which it is affixed are shiftable toward and away from the lower annular seal assembly 11 and the annular base member 10, between open and closed positions. Any appropriate means can be used to shift the upper annular seal assembly 13 and annular top member 12 inclusive of manually operated means. One or more hydraulically actuated cylinders can be used for this purpose, and two such cylinders are shown at 14 and 15. The cylinders 14 and 15, in turn, are affixed to an appropriate support 16, which may be mounted on the stand 9.

For purposes of an exemplary showing, a workpiece (i.e., a welded pair of heat exchanger plates) is diagrammatically illustrated in FIG. 12 at 17. The base member 10 additionally supports an outer ring seal 18 and an inner ring seal 19 which function to seal the inner and outer peripheries of the lower and upper annular seal assemblies 11 and 13. The apparatus or fixture 8 is provided with a plurality of outer peripheral clamps, two of which are shown at 20, and a plurality of inner peripheral clamps, two of which are shown at 21. When the annular top member 12 and its upper annular seal assembly 13 are in their lower, closed positions, the clamps 20 and 21 will engage and clamp the annular top member 12, as will be described hereinafter. The nature of clamps 20 and 21 does not constitute a limitation. The clamps 20 and 21 may be manually actuated, electrically actuated, mechanically actuated or hydraulically actuated.

The major elements of the apparatus of the present invention having been set forth, then will each now be discussed in greater detail. As indicated above, the annular base member 10 is fixedly mounted on stand 9. The base member 10 is preferably metallic in nature and has the lower annular seal assembly 11 affixed thereto. The lower annular seal assembly 11 comprises a plurality of metallic segments of the type illustrated in FIGS. 3 and 6. These metallic segments are arranged alternately side-by-side on the base member 10 to form the lower annular seal assembly 11.

Reference is now made to FIG. 3. FIG. 3 illustrates the first type of lower annular seal metallic segment, designated by index numeral 22. The segment 22 is a plate-like member having planar top and bottom surfaces. The top surface is illustrated in FIG. 3. Segment 22 has a curved inside edge 23, a curved outer edge 24, and parallel, rectilinear side edges 25 and 26. Segment 22 is provided with three perforations 27 for the receipt of bolts, by which it is affixed to annular base member 10. The segment 22 is also provided with a plurality of small perforations 28, the purpose of which will be apparent hereinafter.

Formed on the upper surface of segment 22 there is a shallow depression 29. The depression 29 is similar in size and configuration to the gas ports 4 and 4a of the plate pair 1-2 of FIG. 2. Within the confines of depression 29, there is formed a pair of holes 30, and an addition perforation 31. Again, the purpose of these holes 30 and perforation 31 will be apparent hereinafter.

Reference is now made to FIGS. 4 and 5. Located within depression 29 on the upper surface of segment 22 there is a spacer plate 32. The spacer plate 32 is a metallic member, having the same shape as depression 29 and fitting within depression 29 with a narrow clearance. Spacer plate 32 is provided with a pair of holes 33 which correspond to the holes 30 in segment 22. The holes 33 are adapted to receive machine screws 34 which threaddedly engage in the holes 30 of segment 22 to firmly mount spacer plate 32 to the segment. On its underside, spacer plate 32 has a transverse groove 35, which communicates with the perforation 31 in segment 22. The purpose of spacer 32 and its groove 35 will be apparent hereinafter.

The upper surface of segment 22 is provided with an inner seal 36. The inner seal 36 comprises a narrow band of soft, low durometer rubber or plastic material adapted to engage the lower plate of the plate pair to be tested. The inner seal 36 is so sized as to surround the continuous weld line 6 of the plate pair to be tested and to form an air tight seal thereabout. The upper surface of inner seal 6 may be so molded as to match that surface of the lower plate of the plate pair it contacts. Thus, the upper surface of inner seal 36 may have a "corn cob" texture.

The upper surface of segment 22 is also provided with an outer seal 37. The outer seal 37 is made of harder, high durometer plastic or rubber material. As is evident from FIGS. 4 and 5, the outer seal 37 is evenly spaced from the inner seal 36 and extends to the end edges 23 and 24 and the side edges 25 and 26 of segment 22. It will be apparent from FIG. 5 that the thickness of outer seal 37 is less than the thickness of inner seal 36. The upper surface of outer seal 37 may also be given a matching surface texture, corresponding to that area of the lower plate of the plate pair it engages. Again assuming that the lower plate has a "corn cob" surface, the upper surface of outer seal 37 will be similarly configured. It is important to note that the perforations 28 in plate 22 are exposed in the space between inner seal 36 and outer seal 37. The reason for this will be apparent hereinafter. The inner and outer seals 36 and 37 may be affixed to the upper surface of segment 22 in any appropriate way including adhesively and the like.

Reference is now made to FIG. 6 wherein the second type of metallic segment, making up the lower annular seal assembly 11, is shown at 38. The segment 38 comprises a planar metallic member having a curved inside edge 39, a curved outside edge 40, and angularly related, rectinear side edges 41 and 42. It will be noted that the outside edges 41 and 42 converge toward the inside edge 39.

Segment 38 is provided with a series of perforations 43 by which it may be bolted to the upper surface of annular base member 10. Segment 38 is also provided with a plurality of perforations 44, equivalent to perforations 28 of segment 22. The purpose of perforations 44 will be apparent hereinafter.

The planar upper surface of segment 38 has a shallow depression 45 formed therein. It will be apparent that the shallow depression 45 is similar in size and shape to the gas ports 5 and 5a of the welded plate pair to be tested. In the region of depression 45, plate 38 has a pair of perforations 46, with an additional perforation 47 located therebetween. The purpose of perforations 46 and 47 will be apparent hereinafter.

Reference is now made to FIGS. 7 and 8. It will be apparent from these Figures that a spacer plate 48 is mounted within depression 45. The spacer plate 48, equivalent to spacer plate 32 of FIGS. 4 and 5, has a peripheral space substantially the same as depression 45 and fits therein with narrow clearance. Spacer plate 48 is provided with a pair of perforations 49 corresponding to perforations 46 in segment 38. The perforations 49 are adapted to receive machine screws 50 which threadedly engage in segment perforations 46, whereby spacer plate 48 is firmly affixed to segment 38. It will be noted from FIGS. 7 and 8 that spacer plate 48 has a transverse groove 51 formed in its bottom surface. The groove 51 communicates with the perforation 47 in segment 38. The purpose of groove 51 will be apparent hereinafter.

As in the case of segment 22, the upper surface of segment 38 is provided with an inner seal 52. The inner seal 52 comprises a narrow member evenly spaced from depression 45 and sized to engage the bottom plate of the plate pair to be tested about contiuous weld line 7, forming an air tight seal with the bottom plate of the pair around continuous weld line 7. As in the case of inner seal 36 of FIGS. 4 and 5, the inner seal 52 is made of soft, low durometer, resilient plastic or rubber. The upper surface of segment 38 is also provided with an outer seal 53, similar to outer seal 37 of segment 22. It will be noted from FIGS. 7 and 8 that the outer seal 53 is evenly spaced from inner seal 52 and extends to the inner and outer edges 39 and 40 and the side edges 41 and 42 of segment 38. The outer seal is made of harder, high durometer, resilient plastic or rubber. As in the case of inner seal 36 and outer seal 37 of segment 22, the upper surfaces of inner seal 52 and outer seal 53 may be given the same surface texture as the surface area it contacts on the lower plate of the plate pair to be tested. Assuming that the lower plate has a "corn cob" surface configuration, the same will be true of the upper surfaces of inner seal 52 and outer seal 53. As in the case of segment 22, the space between outer seal 53 and inner seal 52 exposes the perforations 44 for reasons to be set forth hereinafter. The inner seal 52 and the outer seal 53 may be affixed to the upper surface of segment 38 by any appropriate means, inclusive of adhesive means. The inner seal 52 is thicker than outer seal 53.

It will be understood by one skilled in the art that all of the parallel sided segments used to make up lower annular seal assembly 11 will be identical to segment 22 of FIGS. 3, 4 and 5. In similar fashion, all of the wedge-shaped segments used to make up lower annular seal assembly 11 will be identical to segment 38 of FIGS. 6, 7 and 8.

The upper annular seal assembly 13 is made up of parallel sided segments and wedge shaped segments in the same fashion described with respect to the lower annular seal assembly 11. To this end, each of the parallel sided segments and wedge-shaped segments of the upper annular seal assembly 13 are bolted to top member 12. The parallel sided segments of upper annular seal assembly 13 overlie the parallel sided segments 22 of the lower annular seal assembly 1 and are identical to the segments 22 with one exception. The upper parallel sided segments are not provided with a spacer plate 32 and perforations 46 and 47 in the upper segments are eliminated. The wedge-shaped segments of upper annular seal assembly 13 overlie the wedge-shaped segments 38 of the lower annular seal assembly 11 and are identical thereto, again with one exception. The upper wedge-shaped segments are not provided with a spacer plate 48 and perforations 46 and 47 are not present in the upper wedge-shaped segments.

Figure 9:
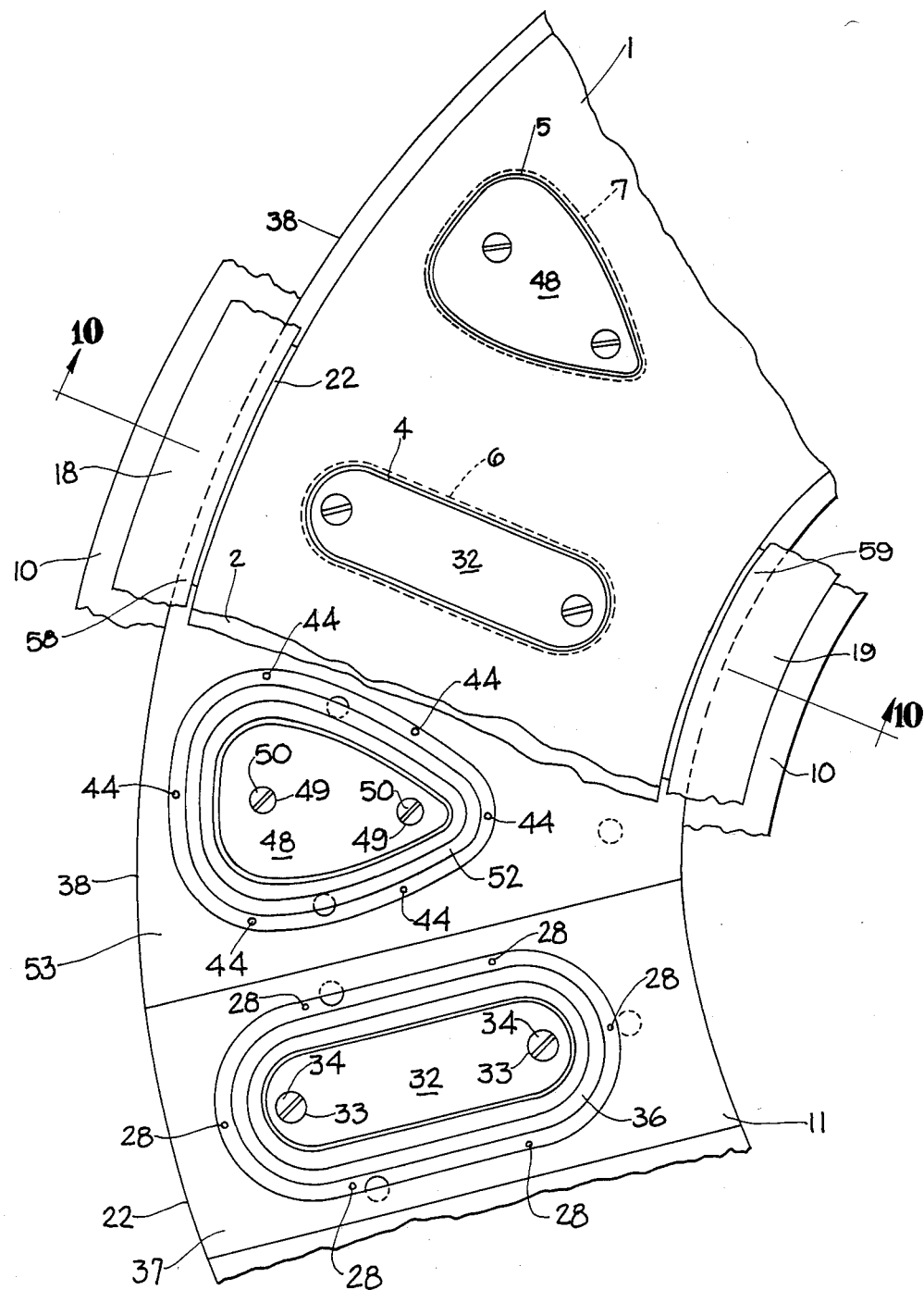
FIG. 9 is a fragmentary plan view illustrating the annular base, the lower annular seal assembly with a welded plate pair mounted thereon and the inner and outer ring seals.

Reference is now made to FIG. 9. In FIG. 9, the annular base member 10 is fragmentarily shown. The lower annular seal assembly 11, made up of segments 22 and 38, is fragmentarily shown mounted on annular base member 10.

FIG. 9 further illustrates, in a fragmentary fashion, a plate pair 1-2 to be tested. The plate pair 1-2 is shown mounted on the lower annular seal assembly 11. It is apparent from FIG. 9 that when the plate pair 1-2 is located on the lower annular seal assembly 11, the spacer plates 32 and 48 of the lower annular seal assembly 11 extend through the gas ports 4 and 5, respectively, of the plate pair 1-2. Thus, one of the functions served by spacer plates 38 and 48 is to properly locate the plate pair 1-2 on lower annular seal assembly 11.

Figure 10:
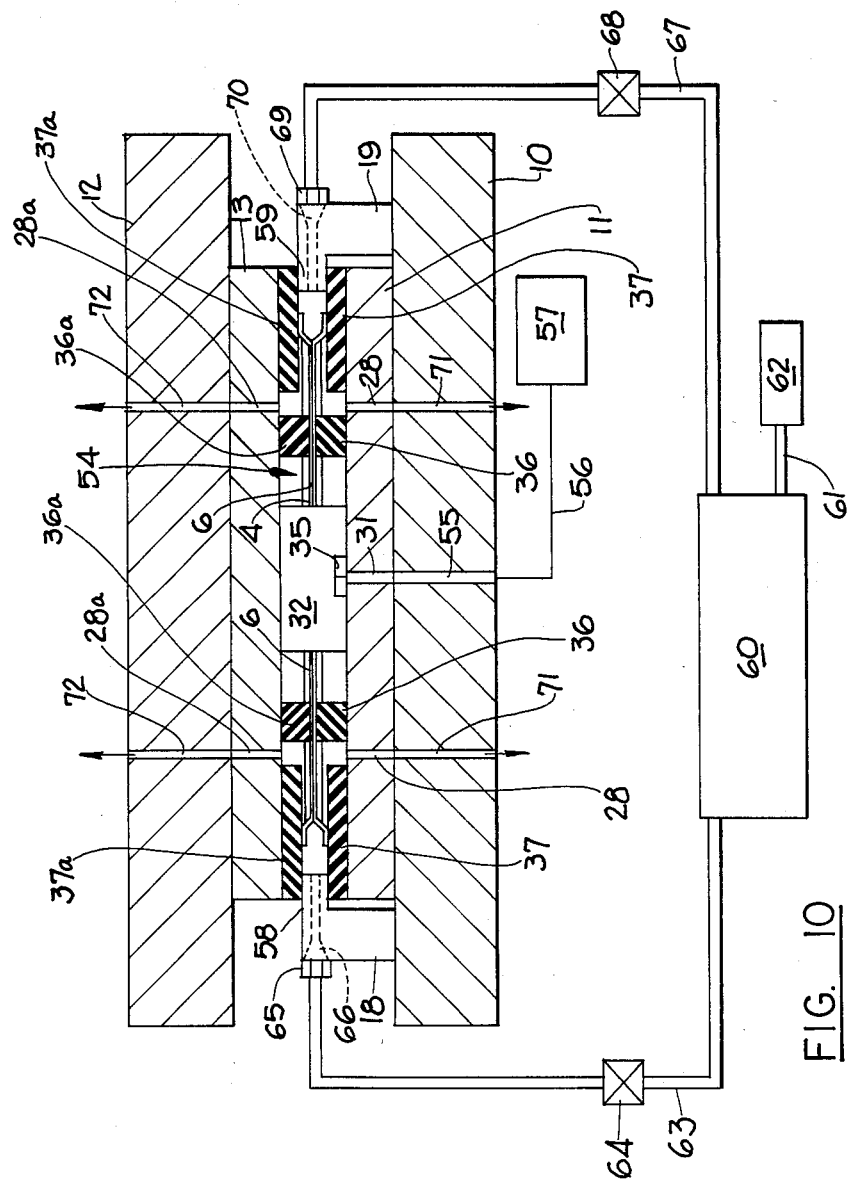
FIG. 10 is a simplified, semi-diagrammatic, fragmentary, elevational view, partly in cross section, illustrating a portion of the apparatus of the present invention.

Reference is now made to FIG. 10. This figure is an enlarged, simplified, semi-diagrammatic cross sectional view taken along section line 10—10 of FIG. 9 and including the annular top member 12 and upper annular seal assembly 13, shown in their lower, closed positions. Like parts have been given like index numerals. For purposes of a clearer showing, some of the parts have been exaggerated in thickness.

As is clear from FIG. 9, the section line 10—10 passes through the center line of a parallel sided segment 22 of the lower annular seal assembly 11. It would be understood that the description to follow with respect to FIG. 10 would be substantially the same had the section line passed through the center line of a wedge-shaped segment 38.

As indicated above, the upper annular seal assembly 13 and the annular top member 12 are shown in their lower, closed positions. It will be noted that the inner seal 36 of lower annular seal assembly segment 22 engages the lower plate 2 of plate pair 1-2 just outside the continuous weld line 6. The outer seal 37 of lower annular seal assembly segment 22 engages the inner and outer peripheries of plate 2.

The corresponding segment of the upper annular seal assembly 13, as indicated above, is substantially identical to segment 22, and its parts will be given the same index numerals followed by "a". Thus, the upper annular seal assembly segment 22a has an inner seal 36a which engages the top plate 1 of the plate pair 1-2 opposite the inner seal 36 of lower annular seal assembly segment 22. Similarly, the outer seal 37a of upper annular seal assembly segment 22a engages the inner and outer periphery of the upper plate 1 of plate pair 1-2 directly opposite outer seal 36 of lower annular seal assembly segment 22. Spacer 32, mounted on segment 22, abuts segment 22a of the upper annular seal assembly 13. Spacer 32 thus serves a second function as a support for segments 22 and 22a. This tends to reduce vibration of the parts during a test cycle. This, in turn, reduces the signal to noise ratio in the leak detectors.

It is apparent from FIG. 10 that the engagement of plates 1 and 2 of the plate pair by the lower inner seal 36 and the upper inner seal 36a results in the formation of a sealed chamber, generally indicated at 54, surrounding the continuous weld line 6 and the gas port 4 of plate pair 1-2. The chamber 54 is connected by groove 35 in spacer 32 to the perforation 31 in segment 22. The perforation 31, in turn, leads to a connecting perforation 55 in annular base member 10. As is diagrammatically indicated in FIG. 10, the perforation 55 is connected by conduit 56 to a leak detector 57. The nature of the leak detector does not constitute a limitation on the present invention. It may take the form, for example, of a linear mass flow meter, as is known in the art. It will be understood by one skilled in the art that a similar sealed chamber will be formed about each of the continuous weld lines 6 and 7 of the plate pair 1-2. Each such chamber will be similarly connected to its own leak detector. In the case of a wedge shaped segment 38 of the lower annular seal assembly 11, the spacer plate notch 51 and perforation 47 will be connected to a perforation (not shown) in annular base member 10, which base member perforation will be connected to its own respective leak detector.

The outer peripheries of lower annular seal assembly 11 and upper annular seal assembly 13 are themselves sealed in air-tight fashion by means of outer ring seal 18. As is most clearly shown in FIGS. 2, 9 and 10, outer ring seal 18 comprises an annular ring-like member having an annularly inwardly extending flange 58. The inwardly extending flange 58 is sealingly engaged by the outer seals 37 and 37a of the lower annular seal assembly 11 and the upper annular seal assembly 13 to make the required peripheral seal. The outer ring seal 18 is mounted on annular base member 10 by any appropriate means (not shown) which will permit slight vertical movement of the outer ring seal 18 when the annular top member 10 and upper annular seal assembly 13 are shifted downwardly and clamped in their lower, closed positions. A peripheral seal of the inner edges of the lower annular seal assembly 11 and the upper annular seal assembly 13 is accomplished in a similar manner by means of inner ring seal 19. As is clear from FIGS. 2, 9 and 10, the inner ring seal comprises an annular ring-like member having an outwardly extending flange 59 which is engaged by outer seals 37 and 37a of lower annular seal assembly 11 and upper annular seal assembly 13, respectively, when the annular top member 12 and upper annular seal assembly 13 are in their lower, closed positions, making the required peripheral seal. As in the case of outer ring seal 18, inner ring seal 19 is also mounted on annular base member 10 by means (not shown) which will permit slight vertical shifting of inner ring seal 19 upon movement of annular top member 12 and upper upper annular seal assembly 13 to their lower, closed positions.

In FIG. 10 a reservoir of pressurized air is shown at 60. The reservoir 60 is connected by conduit 61 to a supply of air under pressure, diagrammatically indicated at 62.

Reservoir 60 is provided with a conduit 63 containing an on-off valve 64. The conduit 63 terminates in a pressure fitting 65 threadedly engaged in a pressure port 66 in outer ring seal 18. The pressure port 66 will direct air under pressure from reservoir 60 between the plates 1 and 2 of the plate pair. The outer ring seal will be provided with a pressure port 66 for each of the segments of the lower annular seal assembly 11. In the exemplary embodiment shown, there would be 20 such ports 66. Each port 66 is connected to the reservoir 60 in the same manner as that shown in FIG. 10.

FIG. 10 further illustrates reservoir 60 being connected by a conduit 67, containing an on-off valve 68 and terminating in a pressure fitting 69 connected to a pressure port 70 in inner ring seal 19. It has been found that it will suffice to provide inner ring seal 19 with about 10 such pressure ports, connected to reservoir 60 in the manner just described.

By the apparatus just described air under pressure from reservoir 60 is introduced between the plates 1 and 2 of plate pair. In this embodiment, it is preferred that the introduction of the air under pressure be an immediate surge-type introduction, which will tend to seat the plates 1 and 2 of the plate pair against outer seals 37 and 37a and inner seals 36 and 36a. Any leakage, particularly at the start of pressurization, between plates 1 and 2 and outer seals 37 and 37a will pass into the space between inner seal 36 and outer seal 37 and the space between inner seal 36a and outer seal 37a. Any such leaked air in the space between inner seal 36 and outer seal 37 will pass through the plurality of perforations 28 formed in segment 22. The perforations 28 are connected to corresponding perforations 71 in annular base member 10, so that leaked air between inner seal 36 and outer seal 37 will be discharged to atmosphere. Similarly, any leaked air between inner seal 36a and outer seal 37a will pass through perforations 28a in upper segment 22a. The perforations 28a are connected to perforations 72 in annular top member 12. The perforations 72 lead to atmosphere. It will be understood that perforations 44 in segments of the type illustrated in FIGS. 6, 7 and 8 will serve the same purpose as perforations 28.

As indicated above with respect to FIG. 2, it is preferred to clamp the annular top member 12 in its lower, closed position by a plurality of outer clamp assemblies 20 arranged evenly about the exterior periphery of annular top member 12 and a plurality of inner clamp assemblies 21 evenly spaced about the inner periphery of the annular top member 12. This assures that during the pressurization portion of the test cycle, the annular top member 12 and its upper annular seal assembly 13 cannot shift upwardly from their normal closed positions. Such an upward shifting might result in "pillowing" of the plates of the plate pair 1-2 being tested. The annular top member 12 and its upper annular seal assembly 13 will be subjected to considerable separating forces during the pressurization portion of the test cycle. For example, if the pressurized air within reservoir 60 is at about 250 psi, the annular top member 10 and its upper annular assembly 13 may be called upon to withstand up to about 100,000 psi.

The apparatus of the present invention having been described in detail, its operation and the method steps of the present invention can now be described.

At the beginning of a test cycle, the annular top member 10 and its upper annular seal assembly 13 will be in their raised, open position, giving access to lower annular seal assembly 11. Clamp assemblies 20 and 21 will be unactuated and valves 64 and 68 will be closed.

The first step in the testing procedure is to locate the heat exchanger plate pair 1-2 on the lower annular seal assembly 11, as shown in FIG. 9. Thereafter, pistons 14 and 15 are actuated to lower the annular top member 10 and its upper annular seal assembly 13 to their closed positions. Inner and outer clamp assemblies 20 and 21 are next actuated to clamp annular top member 10 in its closed position. At this stage, the inner seals of the upper and lower annular seal assemblies 11 and 13 will have formed sealed chambers about each of the continuous weld lines 6 and 7 in the plate pair 1-2 to be tested. Thereafter, air under pressure is suddenly released from reservoir 60 by valves 64 and 68, thereby assuring a good seal between the outer seals of the upper and lower annular seals 11 and 12 against the inner and outer peripheries of the plates 1 and 2, of the pair being tested. The air under pressure will be introduced between the plates and the data from each of the leak detectors 57 will be appropriately logged. This having been accomplished, the clamp assemblies 20 and 21 will be caused to release the annular top member 12. Thereafter, pistons 14 and 15 will be actuated to lift annular top member 12 and its upper annular seal assembly 13. Means may be provided to mark any continuous weld line 6 or 7 which demonstrated a leak requiring repair. Such marking can be accomplished by means well known in the art, including a paint spray means or the like. Thereafter, the tested plate pair 1-2 is removed from the lower annular seal assembly 11 for subsequent use or repair, depending upon the outcome of the test procedure. The apparatus is then ready to perform the next test. Should a catastrophic leak occur at the time of pressurization in the test procedure, valves 64 and 68 should be shut off and the test discontinued.

As indicated above, the steps of the test cycle just outlined lend themselves well to control by computer means. To this end, a computer is generally indicated at 73 in FIG. 2.

The nature of the computer 73 and the manner in which it records the test data do not constitute a limitation on the present invention. As indicated above, the loading and unloading steps of the test cycle can be accomplished by robot means (not shown). As a consequence, the method and apparatus of the present invention can be completely automated.

FIGS. 11 and 12 are similar to FIGS. 4 and 5 and illustrate another embodiment of parallel sided segment for the lower annular seal assembly 11. The segment is designated by index numeral 74 and comprises a planar metallic member having curved inner and outer edges 75 and 76 and parallel side edges 77 and 78. The planar metallic member of the structure of FIGS. 11 and 12 is similar to that of FIG. 3, in that it is provided with perforations 79, through the agency of which it is bolted to the annular base member 10.

Unlike the embodiment of FIGS. 3-5, the segment 74 is provided near its outer edge with an accurate groove 80 in which a hardened metal strip (of stainless steel or the like) is mounted. The hardened metal strip is indicated at 81. In similar fashion, a groove 82 is provided near the inner edge of segment 74, and contains a hardened metal strip 83, similar to the strip 81. Strips 81 and 83 may be affixed in their respective grooves 80 and 82 by any appropriate means inclusive of adhesive means. The upper surfaces of strips 81 and 83 (as viewed in FIG. 11) are machined for flatness. Adjacent grooves 80 and 82, the segment 74 is provided with a plurality of perforations 85. The perforations 85 serve the same purpose as perforations 28 of FIGS. 3-5. The segment is provided an additional perforation 86 which is equivalent to perforation 31 of FIGS. 3-5 and serves the same purpose.

While the segment 74 of FIGS. 11 and 12 could be provided with a depression equivalent to depression 29 of FIGS. 3-5 to receive a spacer plate equivalent to spacer plate 32 of FIGS. 4 and 5, the depression 29 and spacer plate 32 can be eliminated from the embodiment of FIGS. 11 and 12 for reasons given hereinafter.

The segment 74 is completed by an inner seal 87 substantially identical to inner seal 36 of FIGS. 4 and 5. The remainder of the segment 74 from inner seal 87 to the parallel edges 77 and 78 and to the outer and inner rows of perforations 85 is covered with a layer of material equivalent to the outer seal 37 of FIGS. 4 and 5. This layer of material is indicated at 88.

As in the case of the segment of FIGS. 4 and 5, the inner seal is preferably made of a soft, low durometer molded rubber or plastic material. Inner seal 87 is adapted to engage the plate pair to be tested about its continuous weld line 6 in the very same manner described with respect to inner seal 36 of FIGS. 4 and 5. To this end, its exposed surface may be textured to match the texture of the area of the plate of the plate pair it contacts. The material 88, is preferably a harder, high durometer molded rubber of plastic material, and again its exposed surface may be textured to match that portion of the surface of the plate of the plate pair it will engage. In this embodiment, however, the material 88 does not constitute an outer seal, but rather serves simply as a support for that plate of the plate pair it engages.

It will be understood that when segment 74 is used, all of the parallel sided segments of the lower annular seal assembly 11 will be identical to segment 74. In this instance, all of the parallel sided segments of the upper annular seal assembly 13 will also be identical to segment 74 of FIGS. 11 and 12.

Figure 13:
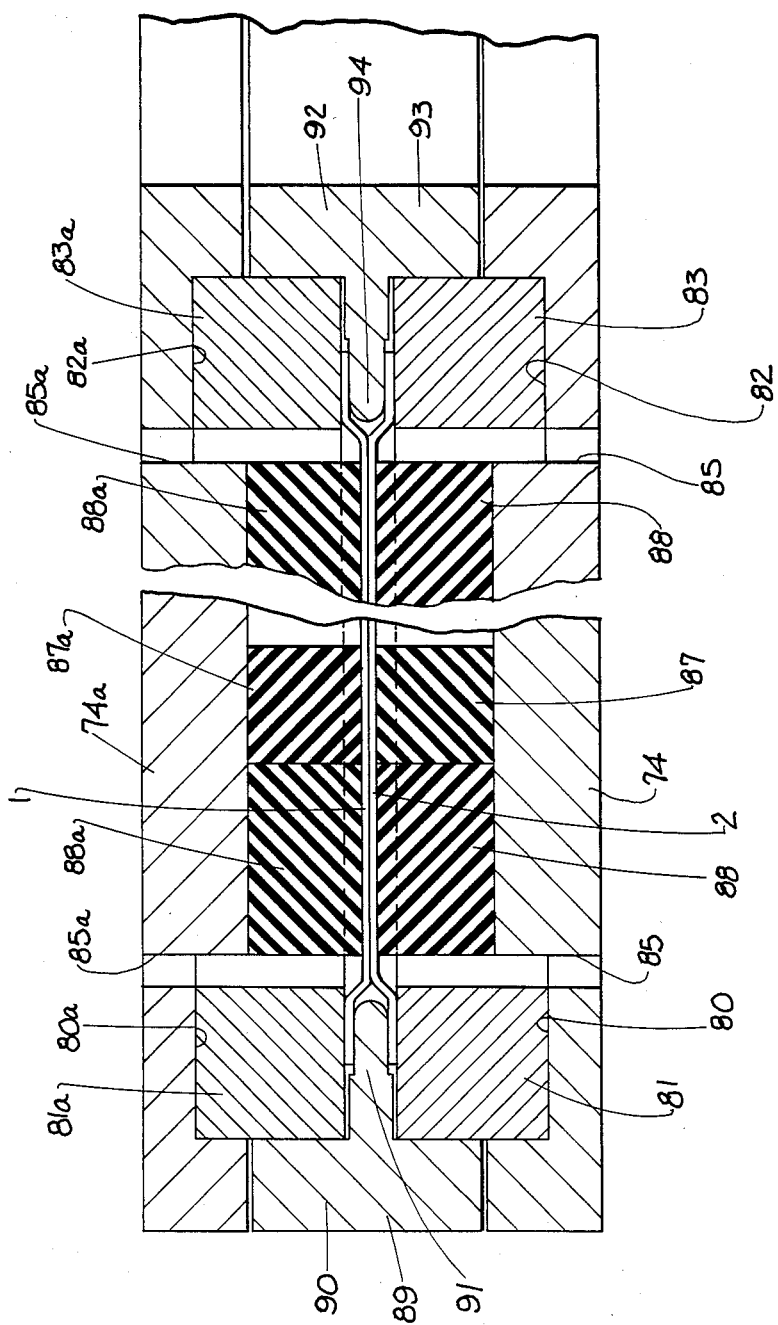
FIG. 13 is a fragmentary cross sectional view illustrating upper and lower segments of the type illustrated in FIG. 11 with a plate pair located therebetween and illustrating another embodiment of inner and outer ring seals.

Reference is now made to FIG. 13 wherein the lower segment 74 is shown together with an upper similar segment. The parts of the upper similar segment are given the same index numerals as the corresponding part of segment 74, followed by "a". A plate pair to be tested, made up of plates 1 and 2 is shown between the segments 74 and 74a. Segment 74a is illustrated in its lower, closed position.

The structure of segments 74 and 74a permit the use of a different type of inner and outer ring seals. The outer ring seal is indicated at 89 and is of T-shape cross section, having a main body portion 90 and an inwardly extending flange 91. Outer ring seal 89 is preferably made of hardened metal. As will be noted in FIG. 13, the main body portion 90 is received between the ends of segments 74 and 74a with a slight clearance. The inwardly extending flange 91 is just nicely received between the outer peripheral edges of the plate pair 1-2 to be tested. Again, the inner ring seal is preferably made of hardened metal. It will be noted that it differs from outer ring seal 89 in that its flange portion 94 extends outwardly of the main body portion 93.

It will be apparent from FIG. 13 that when the segment 74a of the upper annular seal assembly 13 is in its lower, closed position, the outer peripheral edges of the plate pair 1-2 are firmly engaged between outer ring seal flange 91 and the hardened metal strips 81 and 81a. This assures an absolute air-tight seal at the outer peripheral edges of the plate pair 1-2. Similarly, the inner peripheral edges of plate pair 1-2 are engaged between the flange 94 of inner ring seal 92 and the hardened metal strip 83 and 83a, again assuring an excellent air-tight seal.

Not only are excellent air-tight seals achieved at the outer and inner peripheral edges of the plate pair 1-2, but also other advantages are obtained by this construction. First of all, the outer seal does not rely upon engagement of the plate pair 1-2 by resilient seal means. Furthermore, the interaction of hardened metallic strips 81 and 81a and outer ring seal flange 91, together with the interaction of hardened metal strips 83 and 83a with the inner ring seal flange 94 serve the same purpose as spacer 32 of FIGS. 4 and 5, reducing or eliminating vibration during the test cycle and thereby reducing the signal to noise ratio. As indicated above, the material 88 and 88a simply serve as supports for the plate pair 1-2.

Yet another advantage of the construction of FIG. 13 relates to the fact that the inner and outer ring seals 89 and 92 can be applied to the plate pair 1-2 before it is located on the lower annular seal assembly 11. This tends to flatten and rigidify the plate pair 1-2, and remove any kinks in its outer and inner peripheral edges. With the outer and inner ring seals 89 and 92 affixed to the plate pair 1-2, the plate pair is easier to handle, either manually or by robot means. When ring seals 89 and 92 are applied to the plate pair 1-2 manually, this is preferably accomplished remote from the apparatus 8 (see FIG. 2). When applied by robot means, this can be accomplished at the apparatus.

Figure 14:
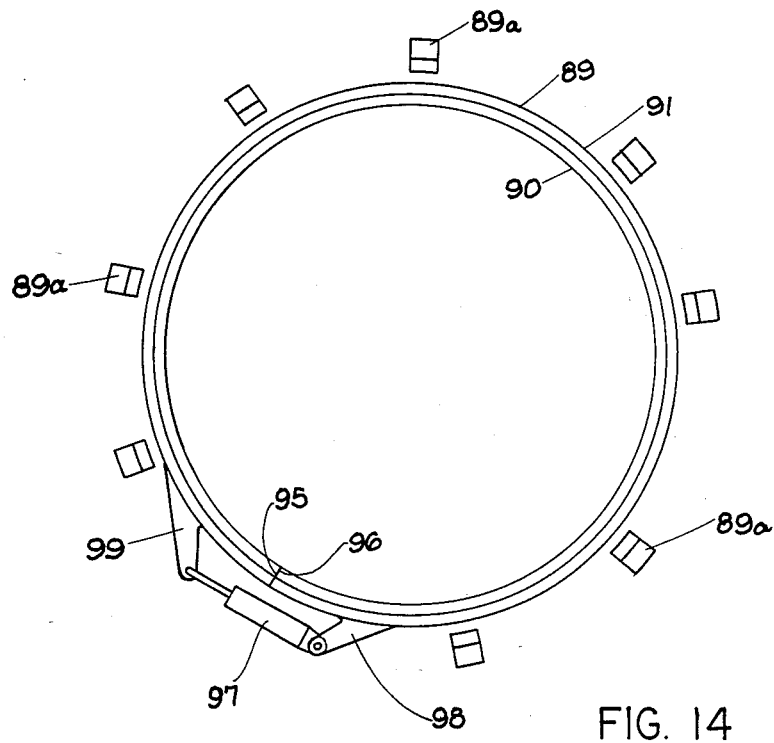
FIG. 14 is a plan view of the outer ring seal of FIG. 13.

Reference is now made to FIG. 14 wherein the outer ring seal 89 is shown. In order that outer ring seal 89 may be applied to the outer periperal edge of the plate pair 1-2 to be tested, the outer ring seal is split, forming end surfaces 95 and 96. End surfaces 95 and 96 are machined, so that they are capable of air-tight abutment, when the ring is closed.

Any appropriate means may be provided to expand and close outer ring seal 89. For example, a spring loaded latch means (not shown) may be used. For purposes of an exemplary showing a cylinder and piston assembly is shown at 97. The free end of the cylinder of the cylinder and piston assembly 97 is pivotally attached to a lug 98 affixed to the exterior of outer ring seal 89 near ring seal end 96. The free end of the piston rod of the piston and cylinder assembly 97 is pivotally attached to a lug 99 affixed to the exterior surface of outer ring seal 89 adjacent end surface 95. The cylinder and piston assembly 97 may be air actuated or hydraulically actuated and serves to open and close outer ring seal 89. When the outer ring seal 89 is applied to and removed from the plate pair 1-2 at the apparatus by robot means or the like, a plurality of posts may be provided on or about the annular base member 10 to support outer ring seal 89 in its open expanded conditions. Such posts are shown at 89a in FIG. 14.

Figure 15:
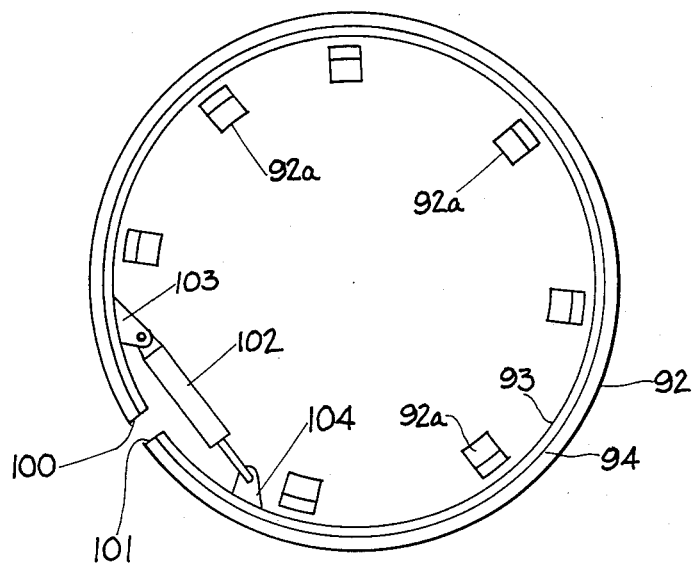
FIG. 15 is a plan view of the inner ring seal of FIG. 13.

Inner ring seal 92 is illustrated in FIG. 15. Inner ring seal 92 is also split, forming ends 100 and 101. Inner ring seal 92 differs from outer ring seal 89 in that when it is engaged between the inner peripheral edges of the plate pair 1-2, it is expanded so that its ends 100 and 101 are spaced from each other. In order to disengage inner ring seal 92 from the plate pair 1-2 it is necessary to shift the inner ring seal ends 100 and 101 toward each other to reduce the diameter of the inner ring seal 92. Again, spring latch means or the like may be used to accomplish this purpose. For purposes of an exemplary showing, an air actuated or hydraulically actuated cylinder and piston assembly 102 is shown in FIG. 15 with the free end of the cylinder of the cylinder and piston assembly pivotally attached to a lug 103 affixed to the inner surface of ring seal 92 adjacent end 100. The free end of the piston rod of the cylinder and piston assembly 102 is pivotally attached to a lug 104 affixed to the inner surface of ring seal 92 adjacent end 101. When the inner ring seal 92 is applied to and removed from the plate pair 1-2 at the apparatus by robot means or the like, a plurality of posts may be provided on or about the inner periphery of the annular base member 10 to support the inner ring seal 92 in its contracted position. Such posts are shown at 92a in FIG. 15.

As was indicated with respect to FIG. 13, excellent seals at the inner and outer peripheral edges of the plate pair 1-2 are achieved by this construction. This is true throughout the circumference of outer ring seal 89. It is also true throughout the circumference of inner ring seal 92, except at the gap between its ends 100 and 101 which is formed when the inner ring seal 92 is expanded to engage the inner peripheral edges of plate pair 1-2. This gap, however, affords an excellent position to introduce air under pressure from reservoir 60 (see FIG. 10) between the plates 1 and 2 of the plate pair being tested. Since the peripheral seals just described are excellent and do not rely upon resilient material or the like, a single inlet for air under pressure will suffice for the entire assembly.

Figure 16:
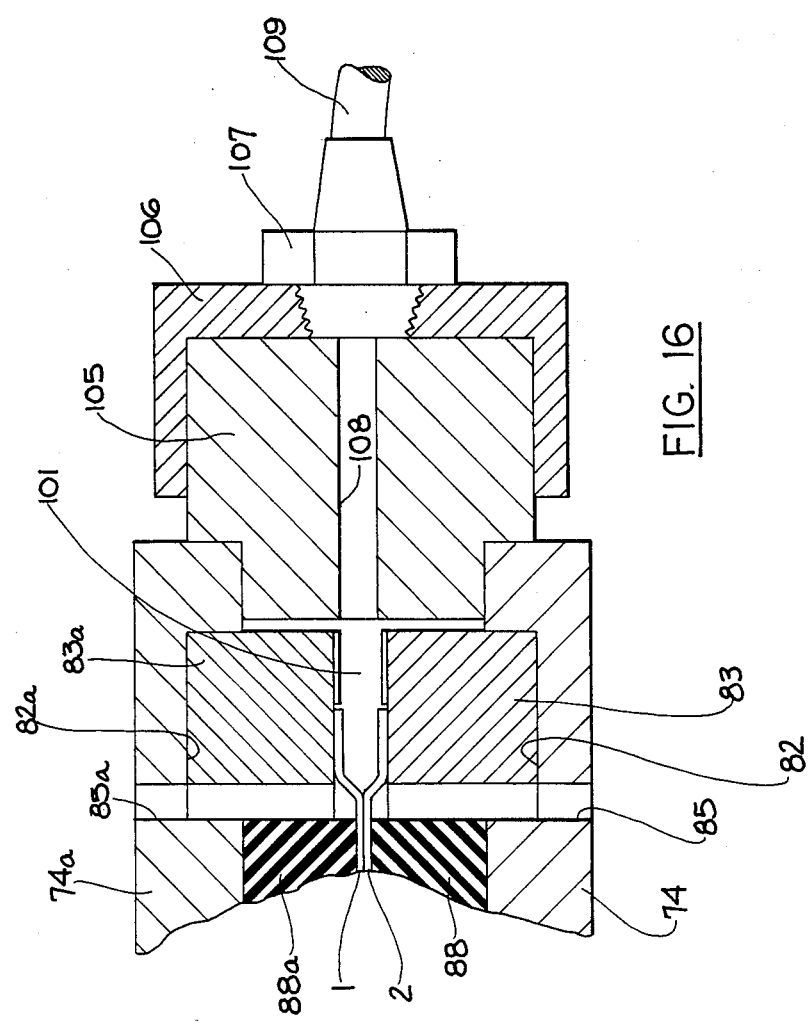
FIG. 16 is a fragmentary cross sectional view of the structure of FIG. 13 with another embodiment of compressed air connection.

Reference is now made to FIG. 6 which illustrates in cross section the inner peripheral edge portions of segments 74 and 74a and the plates 1 and 2 of the plate pair. The cross sectional view of FIG. 16 is taken at the gap between the inner ring seal ends 100 and 101. Again, like parts have been given like index numerals.

FIG. 16 illustrates a resilient plug 105 which is so sized as to sealingly engage the inner ends of segments 74 and 74a together with the opposed ends 100 and 101 of inner ring seal 92. The plug 105 is provided with a surrounding metallic casing 106 in which a conventional pressure fitting 107 is threadedly engaged. The plug 105 is provided with a perforation 108 which communicates with pressure fitting 107. The pressure fitting 107, in turn, is connected by conduit 109 to reservoir 60 (see FIG. 10). It will be understood that the conduit 109 will contain an on-off valve (not shown) equivalent to on-off valve 64 or 68. Since the seals at the peripheral inner and outer edges of the plates of the plate pair 1-2 are fully air-tight, there is no need to introduce the pressurized air during the pressurization portion of the test cycle in a sudden surge, as described with the embodiment of FIG. 10. This is yet another advantage of this construction, and affords better control.

Figure 18:
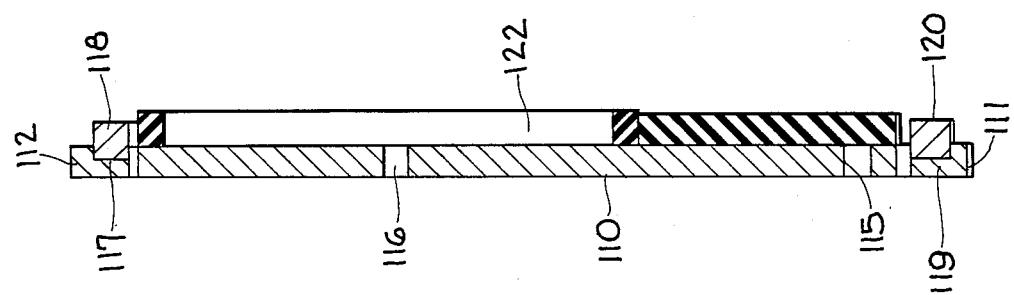
FIG. 18 is a cross sectional view taken along section line 18—18 of FIG. 17.
Figure 17:
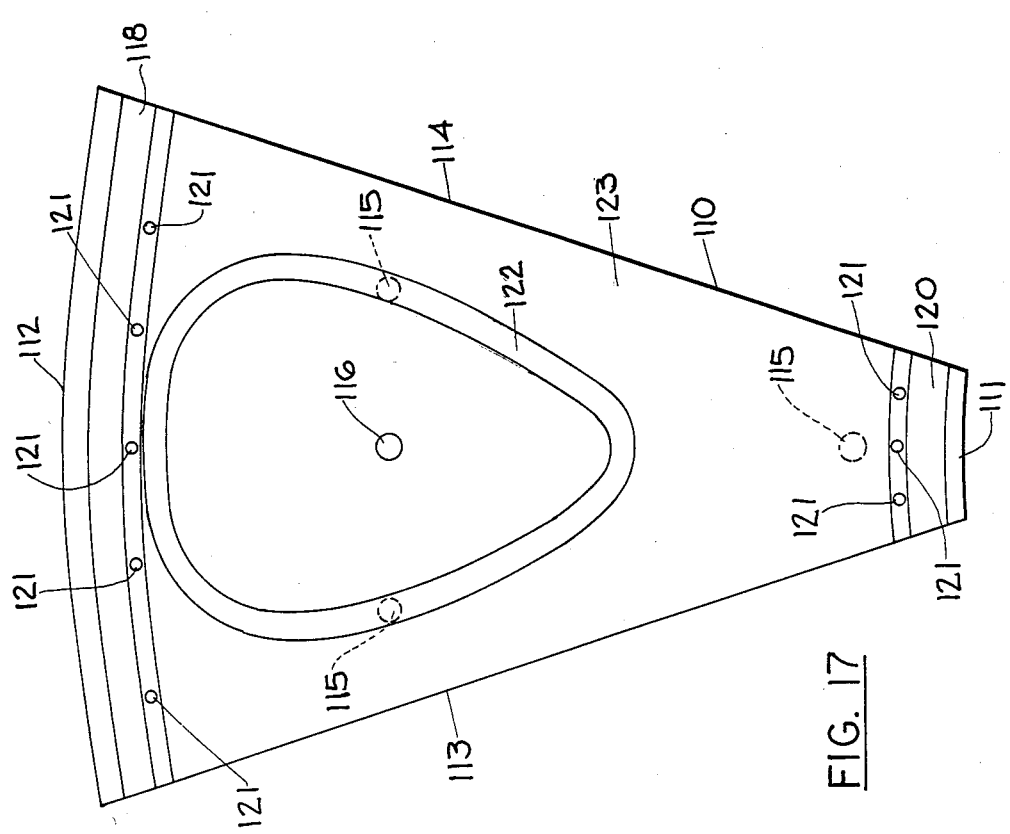
FIG. 17 is a plan view similar to FIG. 7 illustrating another embodiment of a wedge shaped segment.

Reference is now made to FIGS. 17 and 18 wherein a wedge shaped segment of the lower annular seal assembly 11 is shown at 110. It will be understood that the wedge shaped segment 110 is to be used with the wedge shaped segment 74 of FIGS. 11 and 12.

The wedge shaped segment 110 is similar to the wedge shaped segment 38 of FIGS. 6–8 in that it has curved inner and outer edges 111 and 112 together with rectilinear side edges 113 and 114 which converge toward the inner edge 111. Segment 110 comprises a planar metallic member, having perforations 115 equivalent to perforations 43 of FIGS. 6–8, by which segment 110 is attached by machine screws to the annular base member 10. The segment is also provided with a perforation 116 serving the same purpose as perforation 47 of FIGS. 6–8 (i.e., permitting connection to a leak detector). As in the case of segment 74 of FIGS. 11 and 12, the segment 110 could be provided with a depression equivalent to depression 45 of FIG. 6 and a spacer plate equivalent to spacer plate 48 of FIGS. 7 and 8. For the reasons stated above with respect to segment 74 of FIGS. 11 and 12, the provision of such a depression and a spacer plate is not necessary in this embodiment.

Near its outer edge, the segment 110 is provided with a groove 117 accommodating a hardened metallic strip 118. The hardened metallic strip 118 is equivalent to metallic strip 81 of FIGS. 11 and 12. Similarly, near its inner edge, segment 110 is provided with a groove 119 accommodating a hardened metal strip 120, equivalent to the hardened metal strip 83 of FIGS. 11 and 12. Strips 118 and 120 are affixed in their respective grooves 117 and 119 by any appropriate means, inclusive of adhesive means. Adjacent groove 117 and adjacent the groove 119, the segment 110 is provided with a plurality of perforations 121. The perforations 121 are equivalent to and serve the same purpose as perforations 44 of FIGS. 6-8 and perforations 85 of FIGS. 11 and 12.

Segment 110 is provided with an inner seal 122 identical to inner seal 52 of FIGS. 7 and 8 and intended to serve the same purpose. Thus, inner seal 122 forms an air-tight seal about the continuous weld line 7 of the plate pair 1-2 to be tested. The inner seal 122 is surrounded by an outer layer 123 which is the full equivalent of outer layer 88, serving the same support purpose. Outer layer 123 extends from inner seal 122 to segment edges 113 and 114 and to the rows of perforations 121. Inner seal 122 and layer 123 may be made of the same materials described with respect to inner seal 87 and outer layer 88 of FIGS. 11 and 12. Their upper surfaces, as viewed in FIG. 17, may also be textured to match the surfaces they engage on their respective one of the plates of the plate pair 1-2.

Again, when the segment 110 is used, all of the wedge shaped segments of the lower annular seal assembly 11 will be identical thereto, as will all of the wedge shaped segments of the upper annular seal assembly 13.

It will be understood by one skilled in the art that when the segments 88 of FIGS. 11 and 12 and 110 of FIGS. 17 and 18 are applied to the lower and upper annular assemblies 11 and 13 of the apparatus 8 of FIG. 2, and when ring seals 89 and 92 of FIG. 13 are substituted for ring seals 19 and 19, the operation and method steps described above with respect to FIGS. 2 and 10 remain the same. The ring seals 89 and 92 are affixed to the plate pair 1-2, rather than being mounted on the annular base member 10, as is the case of ring seals 18 and 19. Only one pressurization inlet is required for apparatus 8 and the pressurization step can be a gradual one, as indicated above.

Modifications may be made in the invention without departing from the spirit of it. For example, the inner seal 87 and the material 88 of FIGS. 11 and 12 could constitute a single, integral, one-piece member made of the soft, low durometer, molded plastic or rubber material. The same is true of inner seal 122 and the material 123 of FIGS. 17 and 18.

What we claim is:

1. An apparatus for testing the integrity of the welds in the annular plate pairs of a heat exchanger of the type comprising a stack of said pairs of plates, said plates of each pair are substantially identical, having first and second sets of gas ports arranged alternately about each plate, said plates of each pair are joined together in back-to-back fashion with their first and second gas ports aligned, by continuous welds surrounding said aligned gas ports, those portions of said plates of said pairs located between adjacent ones of said first and second gas ports thereof being spaced from each other to permit passage of gas therebetween, said test apparatus comprising a fixed base member and a top member shiftable vertically toward and away from said base member between open and closed positions, a lower annular seal assembly mounted on said base member, an upper annular seal assembly mounted on said top member facing said lower annular seal assembly, when a plate pair is located on said lower annular seal assembly and said top member is shifted to said closed position, means are provided to form air-tight seals about the inner and outer peripheries of said upper and lower seal assemblies, means are provided on said upper and lower seal assemblies to form a sealed chamber about each of said continuous welds and the gas port it surrounds, a leak detector is connected to each of said sealed chambers, and means are provided to introduce air under pressure between said plates of said pair, whereby leakage of air through any of said continuous welds into its respective sealed chamber is identified and recorded by said leak detector connected to said sealed chamber.

* * * * *